United States Patent
Tsuruta et al.

(10) Patent No.: US 11,463,015 B2
(45) Date of Patent: Oct. 4, 2022

(54) POWER CONVERSION APPARATUS

(71) Applicant: Mitsubishi Electric Corporation, Tokyo (JP)

(72) Inventors: Ryoji Tsuruta, Tokyo (JP); Takushi Jimichi, Tokyo (JP); Kimiyuki Koyanagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/040,551

(22) PCT Filed: May 15, 2019

(86) PCT No.: PCT/JP2019/019241
§ 371 (c)(1),
(2) Date: Sep. 23, 2020

(87) PCT Pub. No.: WO2019/221160
PCT Pub. Date: Nov. 21, 2019

(65) Prior Publication Data
US 2021/0044215 A1    Feb. 11, 2021

(30) Foreign Application Priority Data
May 17, 2018    (JP) .............................. JP2018-095146

(51) Int. Cl.
*H02M 7/219*     (2006.01)
*H02M 1/32*      (2007.01)
(Continued)

(52) U.S. Cl.
CPC ............. *H02M 7/219* (2013.01); *H02M 1/32* (2013.01); *H02M 7/483* (2013.01); *H02M 1/0003* (2021.05)

(58) Field of Classification Search
CPC ........ H02M 7/219; H02M 1/32; H02M 7/483; H02M 1/0003; H02M 1/325; H02M 7/4835; H02M 1/092; H02M 1/0006
See application file for complete search history.

(56) References Cited

U.S. PATENT DOCUMENTS 4,432,363 A * 2/1984 Kakegawa ........... A61N 1/3787
607/33
5,986,909 A * 11/1999 Hammond ........... B60L 15/007
363/65

(Continued)

FOREIGN PATENT DOCUMENTS

JP    2016-163391 A    9/2016
WO    2012/033958 A1   3/2012

OTHER PUBLICATIONS

International Search Report and Written Opinion dated Jun. 25, 2019 for PCT/JP2019/019241 filed on May 15, 2019, 8 pages including English Translation of the International Search Report.

*Primary Examiner* — Peter M Novak
(74) *Attorney, Agent, or Firm* — Xsensus LLP

(57) ABSTRACT

A submodule includes a bridge circuit including two main power semiconductors connected in series for performing power conversion by on/off control and an electric energy storage element connected in parallel with a path of the two main power semiconductors connected in series, a bypass unit including a bypass power semiconductor), a bypass unit drive device to drive the bypass unit, a first external terminal, and a second external terminal. The first external terminal is connected to a node between the two main power semiconductors. The power conversion apparatus further includes an optical power-feed system for feeding power to the bypass unit drive device.

17 Claims, 10 Drawing Sheets

(51) Int. Cl.
*H02M 7/483* (2007.01)
*H02M 1/00* (2006.01)

(56) References Cited

U.S. PATENT DOCUMENTS

| | | | | |
|---|---|---|---|---|
| 2011/0019449 A1* | 1/2011 | Katoh | ................... | H02M 7/483 |
| | | | | 363/124 |
| 2012/0068555 A1* | 3/2012 | Aiello | ................. | H02M 7/4833 |
| | | | | 307/115 |
| 2014/0097804 A1* | 4/2014 | Hasler | ................... | H02M 7/483 |
| | | | | 320/166 |
| 2019/0280519 A1* | 9/2019 | Heo | ........................ | H02J 9/061 |

* cited by examiner

⟶ SHORT-CIRCUIT CURRENT PASSING THROUGH MAIN POWER SEMICONDUCTOR ALONE

--⟶ SHORT-CIRCUIT CURRENT PASSING THROUGH BYPASS POWER SEMICONDUCTOR

POWER CONVERSION APPARATUS

CROSS-REFERENCE TO RELATED APPLICATIONS

The present application is based on PCT filing Application No. PCT/JP2019/019241, filed May 15, 2019, which claims priority to JP 2018-095146, filed May 17, 2018, the entire contents of each are incorporated herein by reference.

TECHNICAL FIELD

The present disclosure relates to a power conversion apparatus and more particularly to a power conversion apparatus including a plurality of submodules that are unit converters connected in series.

BACKGROUND ART

A modular multilevel converter (MMC) is configured such that a plurality of submodules including power semiconductors such as insulated gate bipolar transistors (IGBTs) and electric energy storage elements such as capacitors are connected in series.

MMCs are power conversion apparatuses suitable for high voltage and large power capacity and find applications to high-voltage motor drives or high voltage direct current (HVDC) transmission systems.

When abnormality such as failure occurs in a submodule in the MMC, a bypass unit bypasses the abnormal module to enable continuous operation of the entire system.

For example, PTL 1 discloses a power conversion apparatus including a plurality of unit converters (submodules) connected in series. The unit converter has a main circuit power feeding device. Each unit converter has a mechanical switch having a normally-on characteristic as a bypass unit. When abnormality is detected in a unit converter, the mechanical switch is short-circuited to enable continuous operation of the power conversion apparatus.

CITATION LIST

Patent Literature

PTL 1: Japanese Patent Laying-Open No. 2016-163391

SUMMARY OF INVENTION

Technical Problem

Unfortunately, the bypass unit disclosed in PTL 1 is a mechanical switch and therefore leads to size increase of the power conversion apparatus and requires a longer time for bypass operation compared with semiconductor switches.

On the other hand, when a normally-off power semiconductor is used as the bypass unit and the bypass unit is operated with power supply from the main circuit power feeding device, bypass operation fails to continue if power supply from the main circuit power feeding device is stopped.

An object of the present disclosure is therefore to provide a power conversion apparatus capable of continuing bypass operation even when power supply from the main circuit power feeding device is stopped.

Solution to Problem

A power conversion apparatus according to the present disclosure includes a plurality of submodules connected in series for performing power conversion. The submodules each include a bridge circuit including two main power semiconductors connected in series for performing power conversion by on/off control and an electric energy storage element connected in parallel with a path of the two main power semiconductors connected in series, a bypass unit including a bypass power semiconductor, a bypass unit drive device to drive the bypass unit, a first external terminal, and a second external terminal. The bypass unit is disposed between the first external terminal and the second external terminal, and the first external terminal is connected to a node between the two main power semiconductors. The power conversion apparatus further includes an optical power-feed system for feeding power to the bypass unit drive device.

Advantageous Effects of Invention

According to the present disclosure, bypass operation can be continued even when power supply from the main circuit power feeding device is stopped.

BRIEF DESCRIPTION OF DRAWINGS

FIG. 5 is a diagram illustrating a case where abnormality is detected in a second half bridge circuit 204b in submodule 101a.

DESCRIPTION OF EMBODIMENTS

First Embodiment

In a first embodiment, two half bridge circuits are connected in series to form one submodule. The submodule is connected in series with another submodule through an external terminal.

Figure 1:
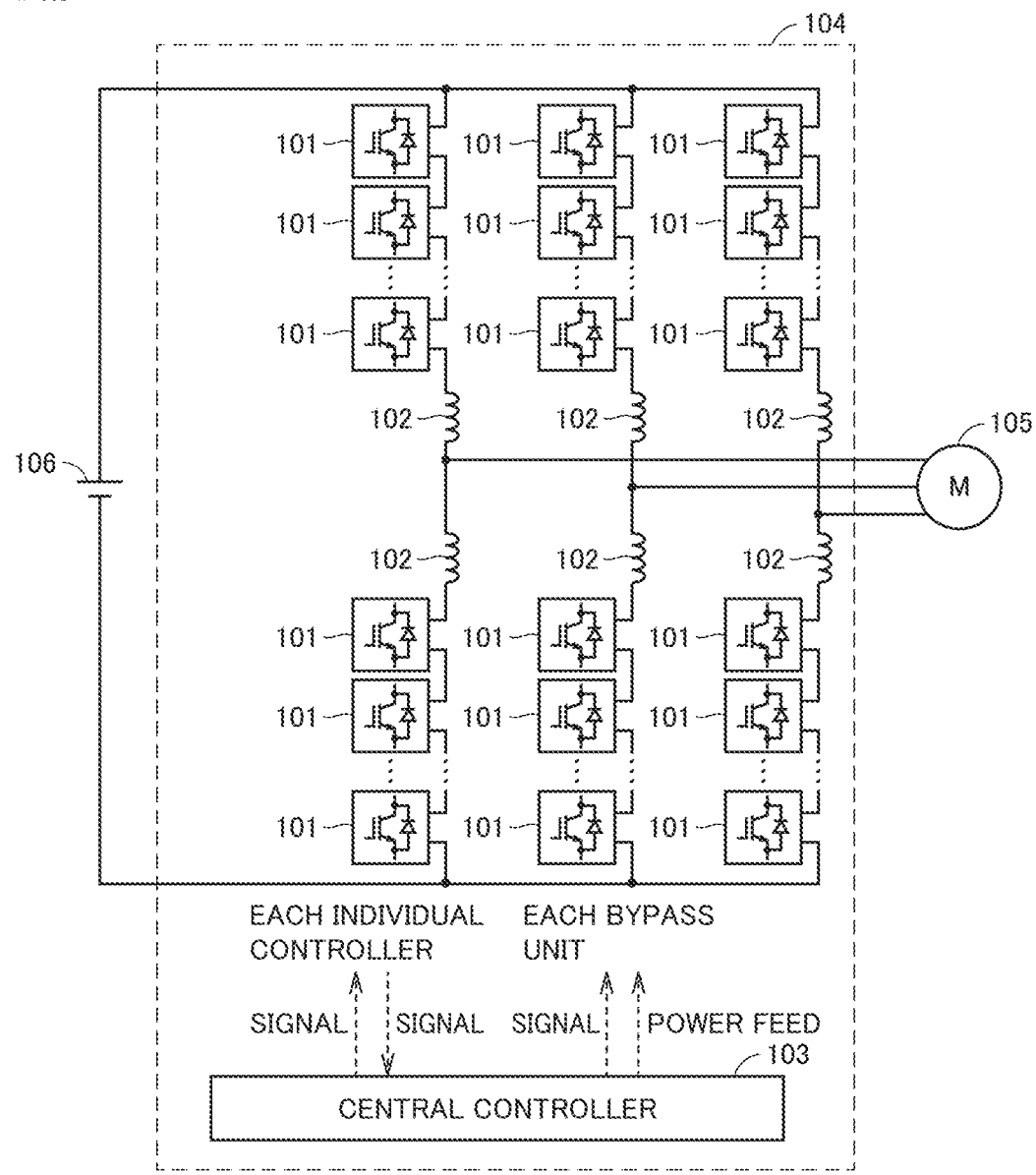
FIG. 1 is a main circuit configuration diagram of a power conversion apparatus 104 of a first embodiment.

FIG. 1 is a main circuit configuration diagram of a power conversion apparatus 104 of a first embodiment.

Power conversion apparatus 104 includes a plurality of submodules 101 and a plurality of reactors 102.

A plurality of submodules 101 are connected in series with reactor 102 to form one arm.

A connection node between reactor 102 in an upper arm and reactor 102 in a lower arm of one phase serves as an output end of one phase of the power conversion apparatus.

A central controller 103 controls operation of submodules 101.

An output end of one phase is connected to a load 105, and the other terminals of the arms that do not serve as output ends are connected to both ends of a DC voltage source 106.

Power conversion apparatus 104 is called, for example, a modular multilevel converter (MMC). The MMC includes, as basic components, submodules 101 and reactors 102. Power conversion apparatus 104 is used, for example, for a drive device of a motor driven at a voltage as high as 3 kV or more. Power conversion apparatus 104 in FIG. 1 is an example of the power conversion apparatus in the present embodiment. The power conversion apparatus in the present embodiment may be of any circuit configuration that includes a plurality of submodules connected in series.

Figure 2:
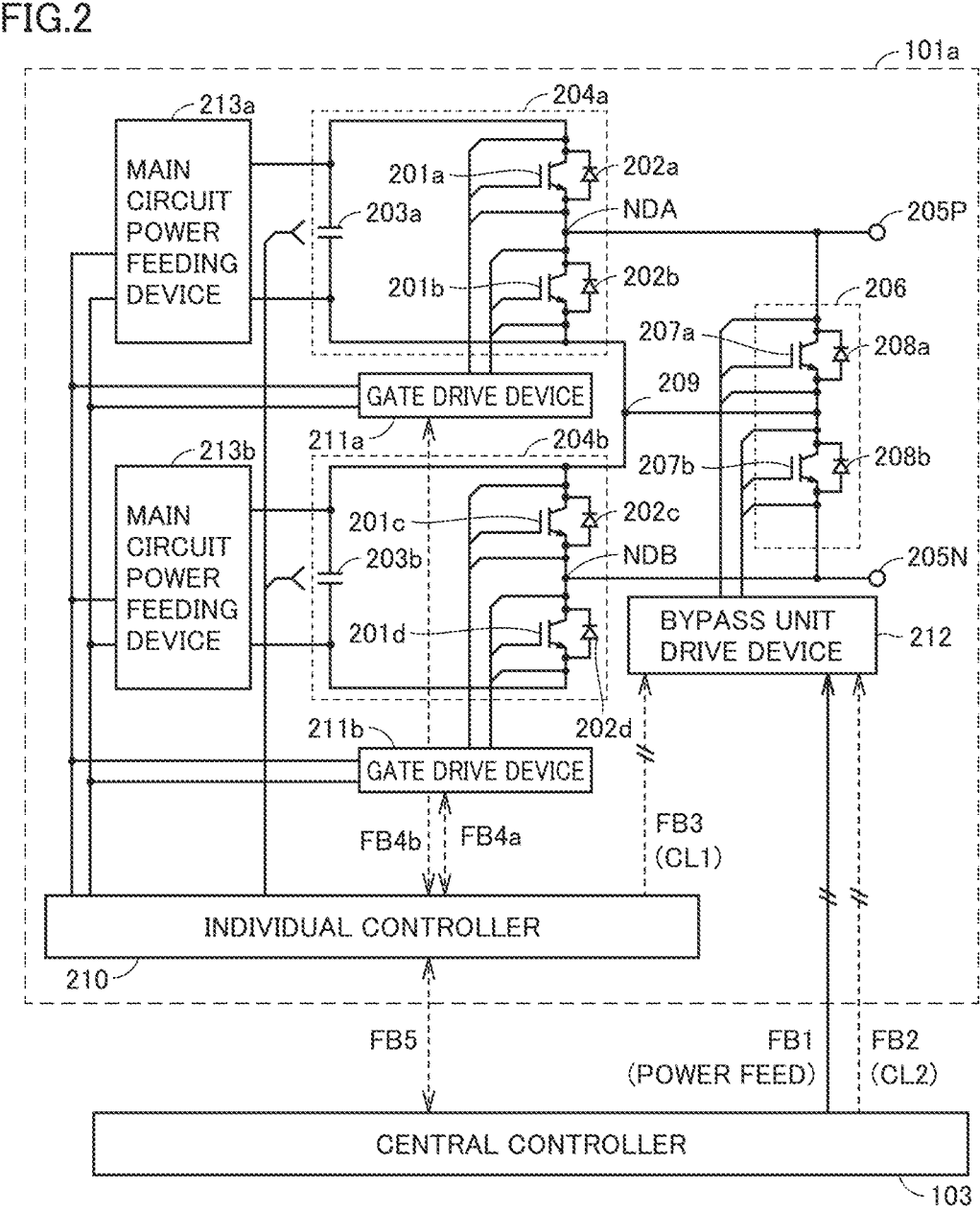
FIG. 2 is a diagram showing a configuration of a submodule 101a in the first embodiment.

FIG. 2 is a diagram illustrating a configuration of a submodule 101a in the first embodiment.

Submodule 101a includes a first half bridge circuit 204a, a second half bridge circuit 204b, a main circuit power feeding device 213a, a main circuit power feeding device 213b, a gate drive device 211a, a gate drive device 211b, an individual controller 210, a bypass unit 206, and a bypass unit drive device 212.

First half bridge circuit 204a includes a main power semiconductor 201a and a main power semiconductor 201b connected in series, and an electric energy storage element 203a connected in parallel with a path of main power semiconductor 201a and main power semiconductor 201b connected in series. First half bridge circuit 204a further includes a freewheeling diode 202a connected in anti-parallel with main power semiconductor 201a and a freewheeling diode 202b connected in anti-parallel with main power semiconductor 201b.

Second half bridge circuit 204b includes a main power semiconductor 201c and a main power semiconductor 201d connected in series, and an electric energy storage element 203b connected in parallel with a path of main power semiconductor 201c and main power semiconductor 201d connected in series. Second half bridge circuit 204b further includes a freewheeling diode 202c connected in anti-parallel with main power semiconductor 201c and a freewheeling diode 202d connected in anti-parallel with main power semiconductor 201d.

Main power semiconductors 201a to 201d are power semiconductors capable of on/off control and configured with, for example, IGBTs.

Main power semiconductor 201b of first half bridge circuit 204a and main power semiconductor 201c of second half bridge circuit 204b are connected at an intermediate terminal 209.

In this way, since two half bridge circuits 204a, 204b are provided in one submodule 101, the total number of necessary submodules 101 can be reduced compared with when one half bridge circuit 204 is provided in one submodule 101.

A node NDA between main power semiconductor 201a and main power semiconductor 201b is connected to an external terminal 205P of submodule 101a. A node NDB between main power semiconductor 201c and main power semiconductor 201d is connected to an external terminal 205N of submodule 101a.

Bypass unit 206 is connected to external terminal 205P and external terminal 205N and is disposed between external terminal 205P and external terminal 205N.

External terminal 205P is connected to another submodule 101 or reactor 102. External terminal 205N is connected to another submodule 101 or reactor 102.

Bypass unit 206 is provided for bypassing one of first half bridge circuit 204a and second half bridge circuit 204b that is determined to be abnormal when abnormality is detected in submodule 101a. As used herein bypassing means isolating the failed half bridge circuit from the main circuit. The purpose is to allow power conversion apparatus 104 to continue operation by isolating the failed part.

Bypass unit 206 includes a bypass power semiconductor 207a and a bypass power semiconductor 207b connected in series, a freewheeling diode 208a connected in anti-parallel with bypass power semiconductor 207a, and a freewheeling diode 208b connected in anti-parallel with bypass power semiconductor 207b.

Bypass power semiconductor 207a and bypass power semiconductor 207b are connected at intermediate terminal 209.

Individual controller 210 controls bypass unit drive device 212 and gate drive devices 211a, 211b in accordance with control of central controller 103.

Transmission of a signal between central controller 103 and individual controller 210 is performed through an optical fiber FB5. Transmission of a signal between individual controller 210 and gate drive device 211a is performed through an optical fiber FB4a. Transmission of a signal between individual controller 210 and gate drive device 211b is performed through an optical fiber FB4b. Transmission of a signal between individual controller 210 and bypass unit drive device 212 is performed through an optical fiber FB3. Transmission of a signal between central controller 103 and bypass unit drive device 212 is performed through optical fiber an FB2.

Bypass unit 206 is set to an open mode when submodule 101a is normal. The open mode is a state in which current is cut off. For example, when bypass power semiconductor 207a and bypass power semiconductor 207b are formed with IGBTs, a state in which gate voltage is not applied to bypass power semiconductor 207a and bypass power semiconductor 207b or a state in which voltage is applied to negative bias (off command state) is set in the open mode.

When abnormality detection means (not shown) included in individual controller 210 or gate drive device 211 detects abnormality in first half bridge circuit 204a or second half bridge circuit 204b, bypass unit drive device 212 is controlled based on a signal from individual controller 210 or central controller 103. Bypass unit drive device 212 short-circuits one or both of bypass power semiconductor 207a and bypass power semiconductor 207b included in bypass unit 206.

A short circuit can be made independently between external terminal 205P and intermediate terminal 209 and between intermediate terminal 209 and external terminal 205N. This configuration can isolate first half bridge circuit 204a or second half bridge circuit 204b having abnormality from power conversion apparatus 104 to allow power conversion apparatus 104 to continue operation.

Bypass power semiconductor 207a and bypass power semiconductor 207b are set to the on state by bypass unit drive device 212, if necessary.

Power feeding to bypass unit drive device 212 for turning on bypass power semiconductor 207a and bypass power semiconductor 207b is performed by light transmitted through optical fiber FB1 from central controller 103 connected to the ground potential.

On the other hand, individual controller 210 and gate drive devices 211a, 211b operate with power stored in electric energy storage elements 203a, 203b and supplied from main circuit power feeding devices 213a, 213b.

Here, capacitors are commonly used as electric energy storage elements 203a, 203b. Known techniques (for example, PTL 1) can be applied to main circuit power feeding device 213.

Gate drive device 211a controls on/off of main power semiconductors 201a, 201b, based on a control signal supplied from individual controller 210 through optical fiber FB4a. Gate drive device 211b controls on/off of main power semiconductors 201c, 201d, based on a control signal supplied from individual controller 210 through optical fiber FB4b.

Thus, input/output of power in electric energy storage element 203a, 203b is controlled so that power conversion is performed.

In general, when relatively large power is transmitted to submodule 101 connected to a high potential, the insulation design between the potential of submodule 101 and the ground potential is difficult, leading to size increase of the power-feed system. It is known to provide a power-feed system in which power with the same potential as submodule 101 or with a potential with a small potential difference is supplied by the main circuit power feeding device. On the other hand, when optical power-feed means is used, insulation is easily ensured but power that can be transmitted is as small as a control signal. Compared with main power semiconductors 201a to 201d, bypass power semiconductors 207a, 207b do not perform continuous on/off operation and are set to the continuous on state only when a bypass command is given, and the consumption power for driving is small. Therefore, optical power-feed means can be used as a method of feeding power to bypass unit drive device 212. When power-feed means is light, a power-feed system from central controller 103 can be constructed relatively easily, so that bypass power semiconductor 207 can be turned on independently of the state of main circuit power feeding device 213.

The bypass operation in submodule 101a causes a voltage drop of electric energy storage elements 203a, 203b. If power fed to bypass unit drive device 212 is the power from main circuit power feeding devices 213a, 213b, the on state of main power semiconductors 201a to 201d typically having a normally-off characteristic is unable to be kept when power feeding by main circuit power feeding devices 213a, 213b becomes impossible. Consequently, the continuous operation of power conversion apparatus 104 may fail.

On the other hand, in order to drive bypass power semiconductors 207a, 207b, individual controller 210 transmits a first control signal CL1 to bypass unit drive device 212 through optical fiber FB3 (first transmission path), and central controller 103 transmits a second control signal CL2 to bypass unit drive device 212 through optical fiber FB2 (second transmission path).

The time TX from detection of abnormality in submodule 101a until first control signal CL1 is transmitted from individual controller 210 to bypass unit drive device 212 through the first transmission path (optical fiber FB3) is equal to or shorter than 10 microseconds. The time TY from detection of abnormality in submodule 101a until second control signal CL2 is transmitted from central controller 103 to bypass unit drive device 212 through the second transmission path (optical fiber FB2) is equal to or longer than 10 microseconds. Therefore, TX<TY.

Thus, a fast bypass operation command is executed by first control signal CL1 from individual controller 210. A command to keep bypass power semiconductors 207a, 207b on when the operation of main circuit power feeding device 213 is disabled is executed by second control signal CL2 from central controller 103. Thus, the effect of abnormality in submodule 101a can be reduced.

In addition, bypass power semiconductors 207a, 207b can be quickly turned on using the first transmission path (optical fiber FB3), as an initial response to abnormality occurrence, and thereafter bypass power semiconductors 207a, 207b can be kept on using the second transmission path (optical fiber FB2). In this case, since individual controller 210 and central controller 103 that play respective roles for an initial response and for keeping can be separately used, the effect of abnormality in submodule 101a can be reduced.

Figure 3:
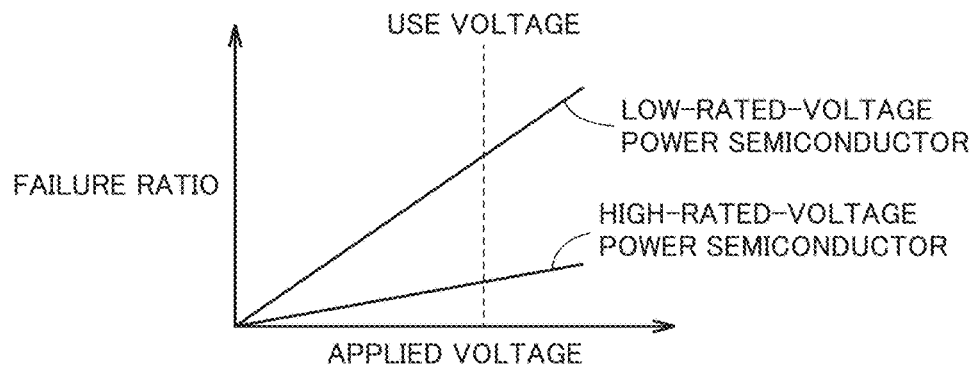
FIG. 3 is a conceptual diagram showing the relation between rated voltage and failure ratio for common power semiconductors.

FIG. 3 is a conceptual diagram illustrating the relation between rated voltage and failure ratio for common power semiconductors. FIG. 3 shows the failure ratio of two power semiconductors with different rated voltages at the same rated current. As shown in FIG. 3, as the applied voltage increases, the failure ratio increases. The failure ratio of a low-rated-voltage power semiconductor is higher than that of a high-rated-voltage power semiconductor.

In submodule 101a, letting VCDC be voltage between both ends of two electric energy storage elements 203a, 203b, the voltage applied to main power semiconductors 201a to 201d is VCDC at maximum. On the other hand, the voltage appearing between external terminal 205P and external terminal 205N, that is, the voltage applied to both ends of bypass unit 206 is 2×VCDC at maximum.

In bypass unit 206, since bypass power semiconductor 207a and bypass power semiconductor 207b are connected in series through intermediate terminal 209, it is assumed that the voltage applied to bypass power semiconductor 207a and to bypass power semiconductor 207b is evenly divided. Thus, the voltage applied to each of bypass power semiconductor 207a and bypass power semiconductor 207b is VCDC at maximum.

Therefore, the withstand voltage of bypass power semiconductors 207a, 207b equivalent to the withstand voltage of main power semiconductors 201a to 201b does not cause destruction. However, bypass unit 206 has to operate reliably at the time of abnormality including a failure in main power semiconductors 201a to 201d. If main power semiconductor 201 and bypass power semiconductor 207 are configured with the same power semiconductors, their failure ratios are nearly equal. It follows that the reliability of bypass unit 206 is far from being sufficiently ensured.

In power conversion apparatus 104 according to the present embodiment, power semiconductors with a rated voltage higher than that of main power semiconductors 201a to 201d, that is, a higher withstand voltage, are used for bypass power semiconductors 207a, 207b. This provides bypass power semiconductors 207a, 207b with higher ruggedness. In general, in power semiconductors, the smaller the ratio of the applied voltage to the rated voltage of a power semiconductor, the lower the failure ratio. Therefore, even when the same voltage is applied to main power semiconductors 201a to 201d and bypass power semiconductors 207a, 207b, the failure ratio can be significantly reduced by using power semiconductors with a higher rated voltage as bypass power semiconductors 207a, 207b, compared with main power semiconductors 201a to 201d. Consequently, the reliability of bypass unit 206 can be increased.

An example of optical power-feed means to bypass unit drive device 212 for driving bypass power semiconductors 207a, 207b will now be described.

Examples of the optical power-feed means include photodiodes converting light into electricity as light-receiving means and optical fibers as light transmitting means. Electric power that can be handled by photodiodes is typically a few hundreds of mW, and it is difficult to supply drive power for power semiconductors repeating on and off, such as main power semiconductors 201a to 201d.

Drive power Pdrive for turning on/off a power semiconductor is represented by the equation below, with switching frequency fsw, input capacity of the gate of power semiconductor Ciss, and gate voltage VG.

$$P_{drive} = 2 \times (0.5 \times C_{iss} \times VG \times VG) \times f_{sw} \quad (1)$$

Therefore, instantaneous power necessary for changing bypass power semiconductors 207a, 207b from the off state to the on state is the value obtained by dividing by two, where the switching frequency fsw is 1. The reason for dividing by two is that the right side is multiplied by two in Equation (1) to reflect on/off, whereas the bypass operation is only turning on. This power is 1/2000 compared with the power in a case where switching frequency fsw is 1000 Hz.

In order to keep bypass power semiconductors 207a, 207b in the on state, power only in the amount of leakage of electric charge stored in the input capacity is supplied, and this is small compared with power handled by photodiodes. For the reasons above, bypass power semiconductors 207a, 207b are driven via optical fiber FB1 from the ground potential that is reference potential through central controller 103, without using main circuit power feeding device 213. This facilitates power feeding without increasing the apparatus size.

Main circuit power feeding devices 213a, 213b convert the voltage accumulated in electric energy storage elements 203a, 203b due to current flowing through submodule 101a into a voltage suitable for operation of individual controller 210 and gate drive device 211 and supply power to them. However, when electric energy storage elements 203a, 203b do not meet a certain voltage, main circuit power feeding devices 213a, 213b are unable to feed power to individual controller 210 and gate drive device 211. For example, when bypass unit 206 operates so that the entire submodule 101a is bypassed, electric energy storage elements 203a, 203b are subsequently not charged and therefore, the voltage of electric energy storage element 203 decreases and power feeding by main circuit power feeding device 213 fails in the end.

Figure 4:
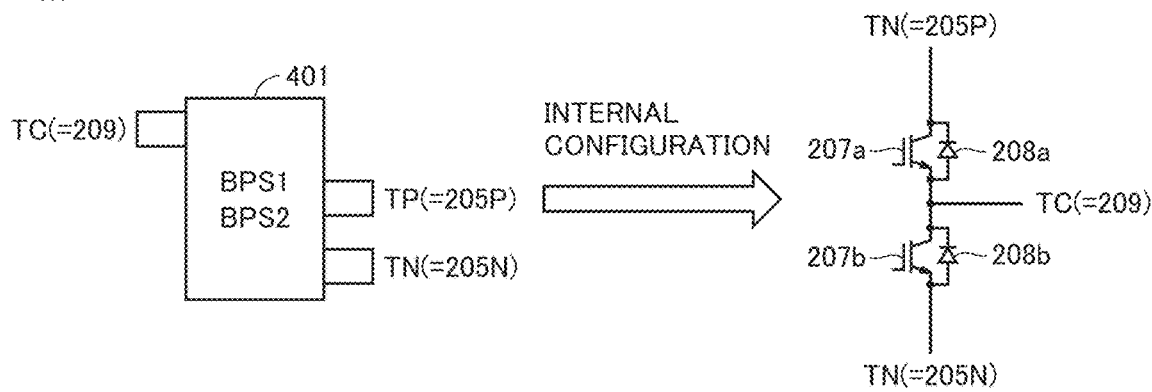
FIG. 4 is a diagram illustrating an example of terminal arrangement and an example of configuration of a power module 401.

FIG. 4 is a diagram illustrating an example of terminal arrangement and an example of configuration of a power module 401.

A power module is a package of a plurality of power semiconductors and saves space with simple arrangement compared with when individual power semiconductors are used. Power module 401 includes a first power semiconductor and a second power semiconductor connected in series, a first freewheeling diode connected in anti-parallel with the first power semiconductor, and a second freewheeling diode connected in anti-parallel with the second power semiconductor. Power module 401 has a terminal TP connected to one end of the first power semiconductor, a terminal TN connected to one end of the second power semiconductor, and a terminal TC connected to the other end of the first power semiconductor and the other end of the second power semiconductor.

Bypass power semiconductors 207a, 207b and freewheeling diodes 208a, 208b of bypass unit 206 can be configured with power module 401.

Specifically, the TP terminal of power module 401 is connected to external terminal 205P of submodule 101a, the TN terminal of power module 401 is connected to external terminal 205N of submodule 101a, and the TC terminal of power module 401 is connected to intermediate terminal 209 of submodule 101a.

As described above, bypass unit 206 can be configured in a single power module 401, leading to size reduction of submodule 101a.

The operation procedure of bypassing half bridge circuit 204 in submodule 101a when abnormality is detected in submodule 101a in power conversion apparatus 104 according to the first embodiment will now be described.

Figure 5:
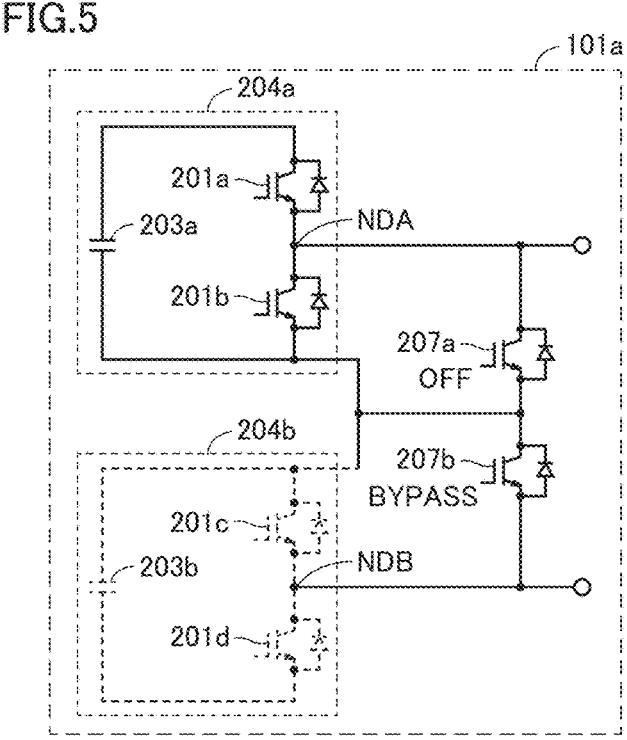

FIG. 5 is a diagram illustrating a case where abnormality is detected in second half bridge circuit 204b in submodule 101a.

When abnormality is detected in second half bridge circuit 204b, a bypass power semiconductor corresponding to second half bridge circuit 204b is turned on based on a command of individual controller 210, and second half bridge circuit 204b is bypassed.

Here, the bypass power semiconductor corresponding to second half bridge circuit 204b is bypass power semiconductor 207b connected in parallel with main power semiconductor 201c of second half bridge circuit 204b. At this time, in order to continue the operation for first half bridge circuit 204a determined to be sound, the off state of bypass power semiconductor 207a is kept.

When abnormality is detected in first half bridge circuit 204a, similar operation is performed in first half bridge circuit 204a. Here, the bypass power semiconductor corresponding to first half bridge circuit 204a is bypass power semiconductor 207a connected in parallel with main power semiconductor 201b of first half bridge circuit 204a.

In general, in order to continue operation without limiting the operation range after bypassing, it is necessary to provide redundancy as appropriate in the number of submodules 101 connected in series. As described above, bypassing in units of half bridge circuits 204, rather than bypassing in units of submodules 101a, can reduce the number of required redundant submodules and achieve size reduction.

Figure 6:
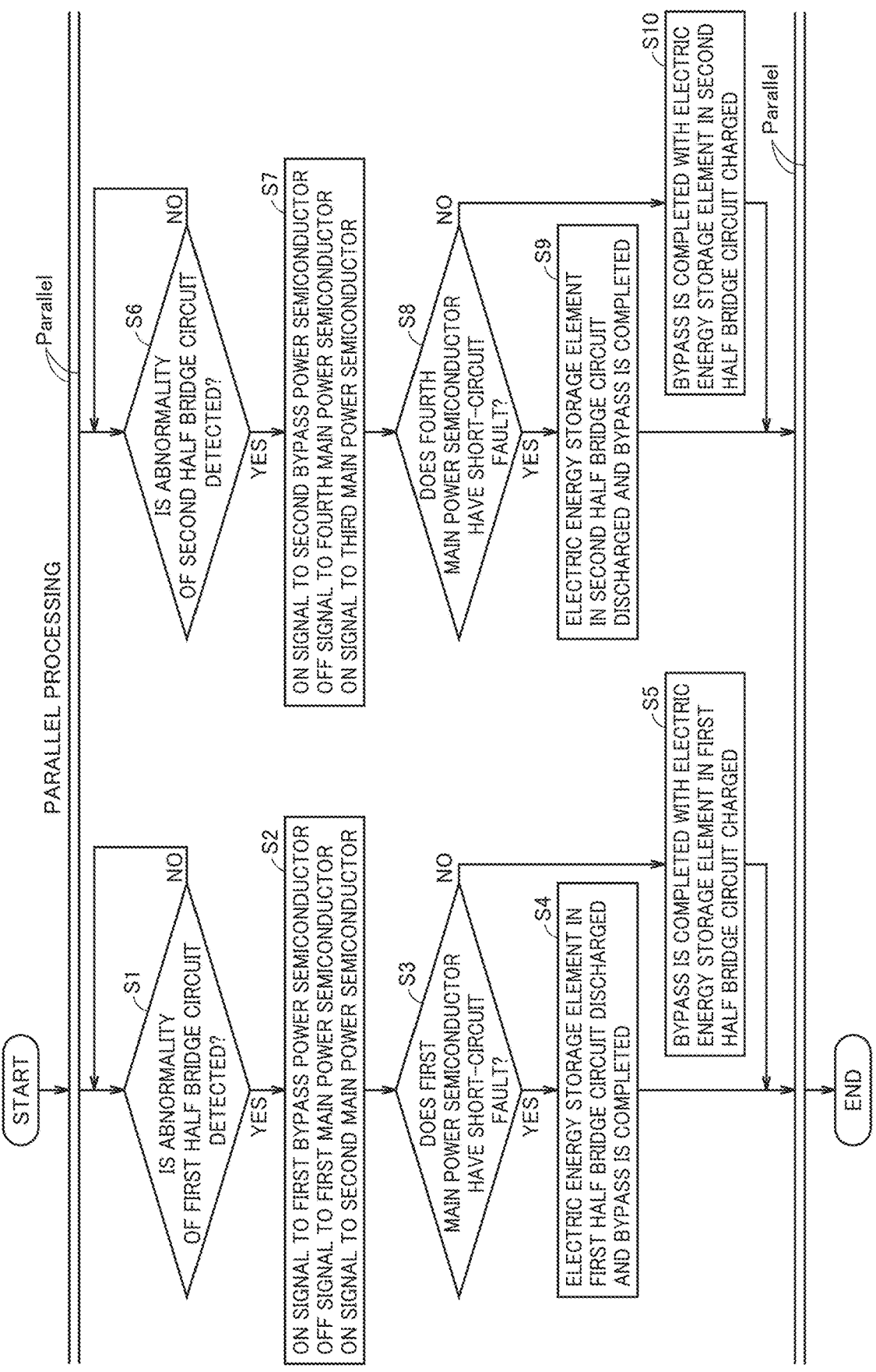
FIG. 6 is a flowchart illustrating an operation procedure from abnormality detection in submodule 101a until bypassing of the half bridge circuit having abnormality detected is completed, in the first embodiment.

FIG. 6 is a flowchart illustrating an operation procedure from abnormality detection in submodule 101a until bypassing of the half bridge circuit having abnormality detected is completed, in the first embodiment.

The reference signs in this description correspond to those in FIG. 2. The processes sandwiched between double lines (Parallel) in FIG. 6 means that the processes are processed in parallel and act independently of each other.

At step S1, abnormality detection means (not shown) included in individual controller 210 or gate drive device 211 detects whether there is abnormality in first half bridge circuit 204a.

If abnormality of first half bridge circuit 204a is detected (S1: YES), the process proceeds to step S2.

At step S2, individual controller 210 gives an on command to bypass power semiconductor 207a and simultaneously gives an on command to main power semiconductor 201b (second main power semiconductor) connected in parallel with bypass power semiconductor 207a and gives an off command to main power semiconductor 201a (first main power semiconductor).

At step S3, if main power semiconductor 201a (first main power semiconductor) has a short-circuit fault (S3: Yes), the process proceeds to step S4.

At step S4, main power semiconductor 201a (first main power semiconductor) has a short-circuit fault and both ends of electric energy storage element 203a are short-circuited to cause short-circuit current to flow, electric energy storage element 203a is discharged, and bypassing of first half bridge circuit 204a is completed. Since main power semiconductor 201b (second main power semiconductor) is set on, short-circuit current is divided. Upon completion of bypassing, current does not flow through main power semiconductor 201a (first main power semiconductor). However, when main power semiconductor 201b (second main power semiconductor) is normal and in the on state, current is shared between main power semiconductor 201b (second main power semiconductor) and bypass power semiconductor 207a.

At step S3, if main power semiconductor 201a (first main power semiconductor) does not have a short-circuit fault (S3: No), the process proceeds to step S5. Here, the case where main power semiconductor 201a (first main power semiconductor) does not have a short-circuit fault includes a case where main power semiconductor 201b (second main power semiconductor) has a short-circuit fault, a case where the power-feed system is abnormal, and a case where a control signal is abnormal.

At step S5, since the voltage across both ends of electric energy storage element 203a is carried by main power semiconductor 201a (first main power semiconductor), short-circuit current does not flow and bypassing of first half bridge circuit 204a is completed with electric energy storage element 203a kept charged.

At step S6, abnormality detection means (not shown) included in individual controller 210 or gate drive device 211 detects whether there is abnormality in second half bridge circuit 204b.

If abnormality of second half bridge circuit 204b is detected (S6: YES), the process proceeds to step S7.

At step S7, individual controller 210 gives an on command to bypass power semiconductor 207b and simultaneously gives an on command to main power semiconductor 201c (third main power semiconductor) connected in parallel with bypass power semiconductor 207b and gives an off command to main power semiconductor 201d (fourth main power semiconductor).

At step S8, if main power semiconductor 201d (fourth main power semiconductor) has a short-circuit fault (S8: Yes), the process proceeds to step S9.

At step S9, main power semiconductor 201d (fourth main power semiconductor) has a short-circuit fault and both ends of electric energy storage element 203b are short-circuited to cause short-circuit current to flow, electric energy storage element 203b is discharged, and bypassing of second half bridge circuit 204b is completed.

Since main power semiconductor 201c (third main power semiconductor) is set on, short-circuit current is divided. Upon completion of bypassing, current does not flow through main power semiconductor 201d (fourth main power semiconductor). However, when main power semiconductor 201c (third main power semiconductor) is normal and in the on state, current is shared between main power semiconductor 201c (third main power semiconductor) and bypass power semiconductor 207b.

At step S8, if main power semiconductor 201d (fourth main power semiconductor) does not have a short-circuit fault (S8: No), the process proceeds to step S10. Here, the case where main power semiconductor 201d (fourth main power semiconductor) does not have a short-circuit fault includes a case where main power semiconductor 201c (third main power semiconductor) has a short-circuit fault, a case where the power-feed system is abnormal, and a case where a control signal is abnormal.

At step S10, since the voltage across both ends of electric energy storage element 203b is carried by main power semiconductor 201d (fourth main power semiconductor), short-circuit current does not flow and bypassing of second half bridge circuit 204b is completed with electric energy storage element 203b kept charged.

As described above, when abnormality is detected, short-circuit current flows through bypass power semiconductor 207a or 207b only in the case of a short-circuit fault of main power semiconductor 201a or 201d. Since short-circuit current is extremely large, short-circuit current flowing through bypass power semiconductors 207a, 207b may cause a failure of bypass power semiconductors 207a, 207b. A failure of bypass power semiconductors 207a, 207b can be prevented by allowing short-circuit current to flow through bypass power semiconductor 207a or 207b only when main power semiconductor 201a or 201d has a short-circuit fault.

Upon completion of bypassing of first half bridge circuit 204a, bypass power semiconductor 207a of bypass unit 206 keeps the on state. Thus, first half bridge circuit 204a is substantially isolated from power conversion apparatus 104, irrespective of the state of main power semiconductor 201a (first main power semiconductor) and main power semiconductor 201b (second main power semiconductor).

Upon completion of bypassing of second half bridge circuit 204b, bypass power semiconductor 207b of bypass unit 206 keeps the on state. Thus, second half bridge circuit 204b is substantially isolated from power conversion apparatus 104, irrespective of the state of main power semiconductor 201c (third main power semiconductor) and main power semiconductor 201d (fourth main power semiconductor).

As described above, according to the first embodiment, in power conversion apparatus 104 of a configuration having a plurality of submodules 101a connected in series, when abnormality in the inside of submodule 101a is detected, half bridge circuit 204 is bypassed whereby the entire power conversion apparatus 104 can continue operation. Submodule 101a is composed of two half bridge circuits 204a, 204b and uses power semiconductors for bypass unit 206. Using power semiconductors as a bypass unit rather than using mechanical switches can reduce the cost for the bypass unit.

In the first embodiment, using bypass power semiconductor 207 with a rated voltage higher than main power semiconductor 201 can improve the reliability of bypass unit 206.

In the first embodiment, bypassing operation can continue by power feeding from the ground potential via an optical fiber even when power supply from the main circuit power feeding device is stopped.

In the first embodiment, bypassing operation can be controlled irrespective of a state of the main circuit of the power conversion apparatus. In the first embodiment, the power-feed system can be implemented with a compact size and inexpensively compared with any other techniques (for example, transformer isolation or contactless power feeding) that are not power-feed systems from the main circuit.

Second Embodiment

A power conversion apparatus according to a second embodiment includes an impedance element at intermediate terminal 209, in addition to the configuration of submodule 101a in the first embodiment shown in FIG. 2.

With this configuration, the bypass power semiconductor can be protected more reliably from destruction due to short-circuit current of the electric energy storage element. The components other than the impedance element additionally inserted are similar to those in the first embodiment.

Figure 7:
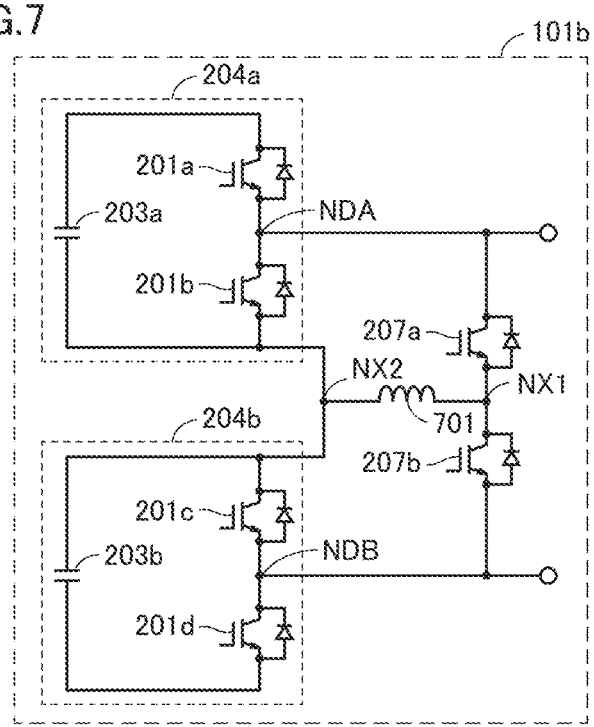
FIG. 7 is a diagram illustrating a configuration of a submodule 101b in a second embodiment.

FIG. 7 is a diagram illustrating a configuration of a submodule 101b in the second embodiment.

Submodule 101b includes an impedance element 701 disposed between a connection point NX1 of two bypass power semiconductors 207a, 207b and a connection point NX2 of two half bridge circuits 204a, 204b.

One of abnormal phenomena of submodule 101b is a short-circuit fault of any one of main power semiconductors 201a to 201d. When main power semiconductor 201a or main power semiconductor 201d has a short-circuit fault and submodule 101b turns on bypass power semiconductor 207a or 207b corresponding to half bridge circuit 204a or 204b having main power semiconductor 201a or 201d having a short-circuit fault, both ends of electric energy storage element 203a or 203b are short-circuited. Consequently, short-circuit current flows to possibly destroy bypass power semiconductor 207a or 207b.

In the present embodiment, short-circuit current is divided by bypass power semiconductor 207a or 207b and main power semiconductor 201b or 201c connected in parallel therewith, and short-circuit current flowing through bypass power semiconductors 207a, 207b is reduced by impedance element 701, whereby bypass power semiconductors 207a, 207b are protected from short-circuit current.

Figure 8:
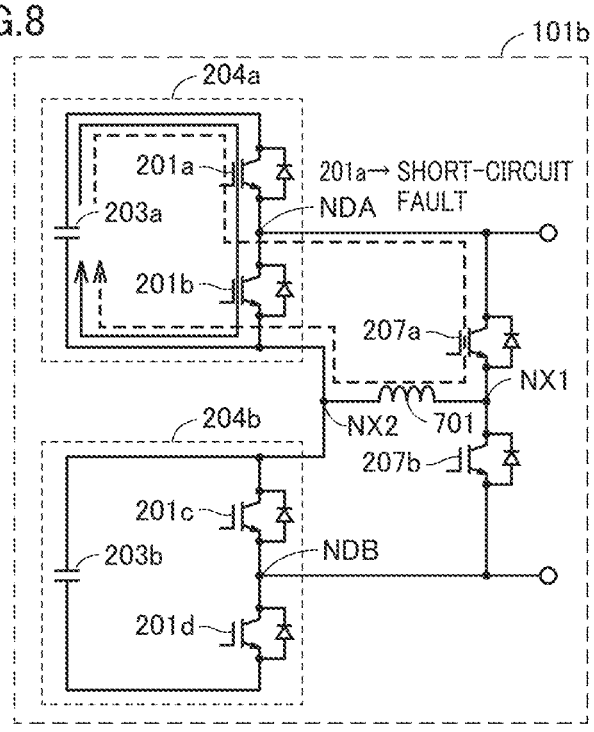
FIG. 8 is a diagram illustrating an example of the path of short-circuit current.

FIG. 8 is a diagram illustrating an example of the path of short-circuit current.

FIG. 8 shows a path of short-circuit current in a case where main power semiconductor 201a has a short-circuit fault in half bridge circuit 204a and bypass power semiconductor 207a is turned on.

When bypass power semiconductor 207a is turned on, gate drive device 211a also turns on main power semiconductor 201b connected in parallel with bypass power semiconductor 207a in accordance with the flowchart shown in FIG. 6. On the other hand, gate drive device 211a turns off main power semiconductor 201a not connected in parallel with bypass power semiconductor 207a. With main power semiconductor 201b turned on, short-circuit current is divided between main power semiconductor 201b and bypass power semiconductor 207a when main power semiconductor 201a has a short-circuit fault and bypass power semiconductor 207a is turned on. Impedance element 701 reduces the short-circuit current flowing through bypass power semiconductor 207a. With main power semiconductor 201a turned off, short-circuit current flowing through bypass power semiconductor 207a is prevented when no short-circuit fault occurs in main power semiconductor 201a but abnormality occurs in half bridge circuit 204a and bypass power semiconductor 207a is turned on.

Figure 9:
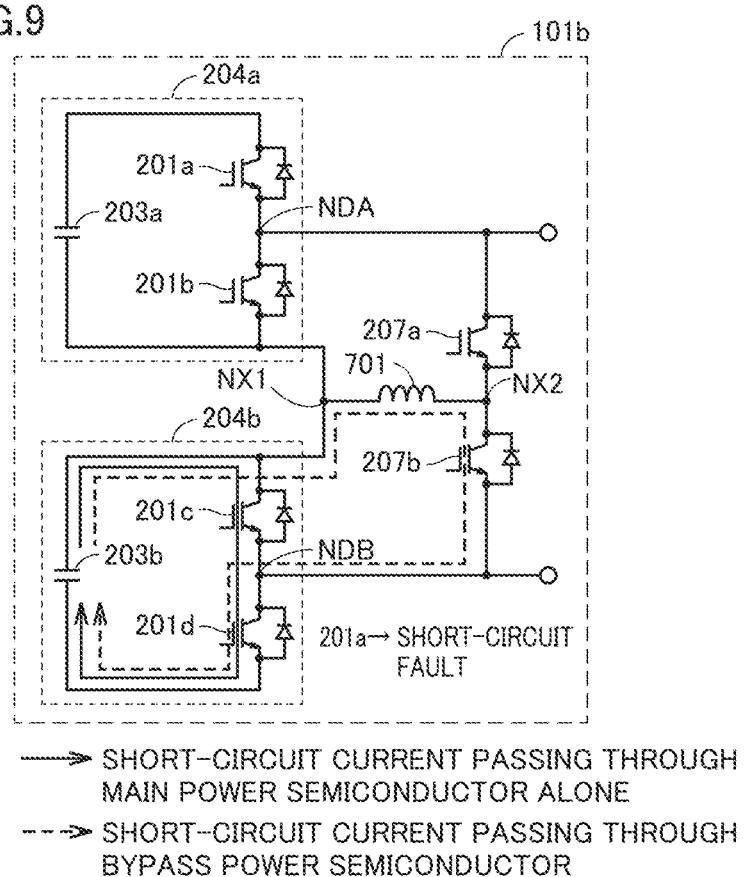
FIG. 9 is a diagram illustrating another example of the path of short-circuit current.

FIG. 9 is a diagram illustrating another example of the path of short-circuit current.

FIG. 9 shows a path of short-circuit current in a case where main power semiconductor 201d has a short-circuit fault in half bridge circuit 204b and bypass power semiconductor 207b is turned on.

When bypass power semiconductor 207b is turned on, gate drive device 211b also turns on main power semiconductor 201c connected in parallel with bypass power semiconductor 207b in accordance with the flowchart shown in FIG. 6. On the other hand, gate drive device 211b turns off main power semiconductor 201d not connected in parallel with bypass power semiconductor 207b.

With main power semiconductor 201c turned on, short-circuit current is divided between main power semiconductor 201c and bypass power semiconductor 207b when main power semiconductor 201d has a short-circuit fault and bypass power semiconductor 207b is turned on. Impedance element 701 reduces the short-circuit current flowing through bypass power semiconductor 207b. With main power semiconductor 201d turned off, short-circuit current flowing through bypass power semiconductor 207b is prevented when no short-circuit fault occurs in main power semiconductor 201d but abnormality occurs in half bridge circuit 204b and bypass power semiconductor 207b is turned on.

Impedance element 701 can be implemented by, for example, a reactor.

Impedance element 701 may be implemented by three power modules 401 shown in FIG. 4. More specifically, main power semiconductors 201a, 201b and freewheeling diodes 202a, 202b are configured with a first power module, main power semiconductors 201c, 201d and freewheeling diodes 202c, 202d are configured with a second power module, and bypass power semiconductors 207a, 207b and freewheeling diodes 208a, 208b are configured with a third power module. When these three power modules are connected through conductors, the impedance by wiring of conductors outside the power modules is larger than the impedance by wiring inside the power modules. The impedance element 701 can be implemented using this characteristic. However, the effect of suppressing short-circuit current flow of bypass power semiconductors 207a, 207b using this method is inferior to the case where the impedance is configured with a reactor, for example.

When abnormality is detected in submodule 101b, the on/off of bypass power semiconductors 207a, 207b and main power semiconductors 201a to 201d is controlled, whereby the possibility that short-circuit current flows through bypass power semiconductors 207a, 207b is limited to a case where main power semiconductor 201a or 201d has a short-circuit fault.

The provision of impedance element 701 can reduce short-circuit current in the path indicated by the dotted line in FIG. 8 and FIG. 9 and can reliably protect bypass power semiconductors 207a, 207b from destruction. It is preferable that impedance element 701 has such a characteristic that impedance is large for a frequency component of a few tens of kHz such as short-circuit current and the effect on a fundamental component of a few tens of Hz is minimized.

As described above, the second embodiment can protect the bypass power semiconductors from short-circuit current. Insertion of impedance element 701 into between the connection point of two bypass power semiconductors 207a, 207b and the connection point of two half bridge circuits 204a, 204b can prevent bypass power semiconductor 207 from being destroyed by short-circuit current of electric energy storage elements 203a, 203b.

Third Embodiment

In a power conversion apparatus according to a third embodiment, a submodule has one half bridge circuit, and the submodule is connected in series with another submodule through an external terminal.

Figure 10:
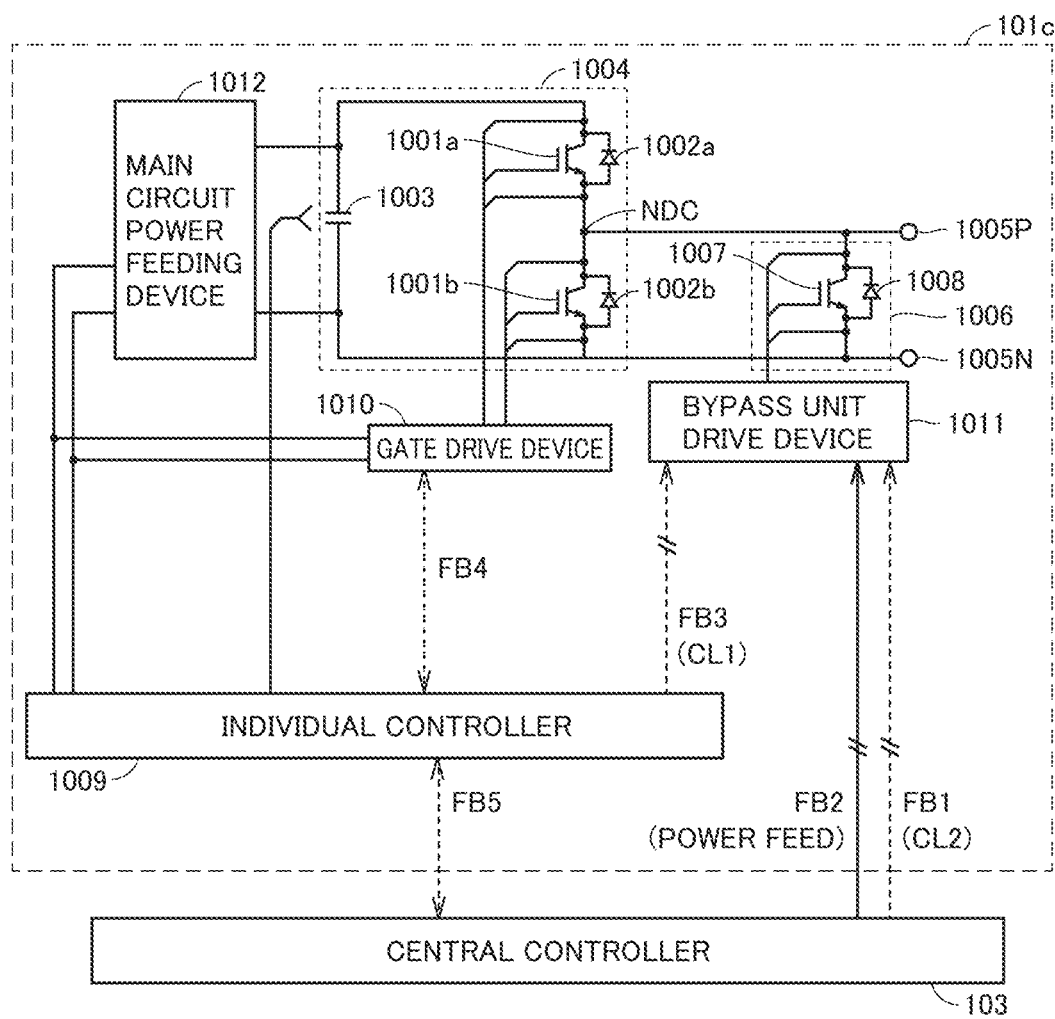
FIG. 10 is a diagram illustrating a configuration of a submodule 101c in a third embodiment.

FIG. 10 is a diagram illustrating a configuration of a submodule 101c in the third embodiment.

Submodule 101c includes a half bridge circuit 1004, a main circuit power feeding device 1012, a gate drive device 1010, an individual controller 1009, a bypass unit 1006, and a bypass unit drive device 1011.

Half bridge circuit 1004 includes a main power semiconductor 1001a (first main power semiconductor) and a main power semiconductor 1001b (second main power semiconductor) connected in series, and an electric energy storage element 1003 connected in parallel with a path of main power semiconductor 1001a and main power semiconductor 1001b.

Freewheeling diodes 1002a, 1002b are connected in anti-parallel with main power semiconductors 1001a, 1001b, respectively.

Main circuit power feeding device 1012 is connected in parallel with electric energy storage element 1003.

A node NDC between main power semiconductors 1001a and 1001b is connected to an external terminal 1005P. A connection point of main power semiconductor 1001b and electric energy storage element 1003 is connected to an external terminal 1005N.

Bypass unit 1006 is connected to external terminal 1005P and external terminal 1005N and disposed between external terminal 1005P and external terminal 1005N.

Bypass unit 1006 is composed of a bypass power semiconductor 1007 and a freewheeling diode 1008 connected in anti-parallel with bypass power semiconductor 1007.

Bypass unit 1006 is in the open mode when submodule 101c is normal. For example, when bypass power semiconductor 1007 is configured with a IGBT, a state in which gate voltage is not applied to bypass power semiconductor 1007 or a state in which voltage is applied to negative bias (off command state) is set in the open mode.

When abnormality detection means (not shown) included in individual controller 1009 or gate drive device 1010 detects abnormality of half bridge circuit 1004, such as a short-circuit fault of main power semiconductor 1001, bypass unit drive device 1011 is controlled based on a signal of individual controller 1009 or central controller 103. Bypass unit drive device 1011 short-circuits bypass power semiconductor 1007 included in bypass unit 1006.

This configuration isolates submodule 101c having abnormality from power conversion apparatus 104 and enables continuous operation of power conversion apparatus 104.

The communication means for a control signal and the power feeding method between gate drive device 1010 and bypass unit drive device 1011, and individual controller 1009 and central controller 103 are similar to the first embodiment.

The maximum voltage appearing between both ends of external terminals 1005P, 1005N is equal to voltage VCDC between both ends of electric energy storage element 1003. Therefore, the maximum voltage applied to bypass power semiconductor 1007 is basically equal to the maximum voltage applied to bypass power semiconductors 207a, 207b described with reference to FIG. 2 in the first embodiment.

Therefore, also in the third embodiment, a power semiconductor having a rated voltage higher than main power semiconductors 1001a, 1001b is used for bypass power semiconductor 1007, in the same manner as bypass power semiconductors 207a, 207b in the first embodiment. With this configuration, the reliability of bypass unit 1006 can be improved.

Figure 11:
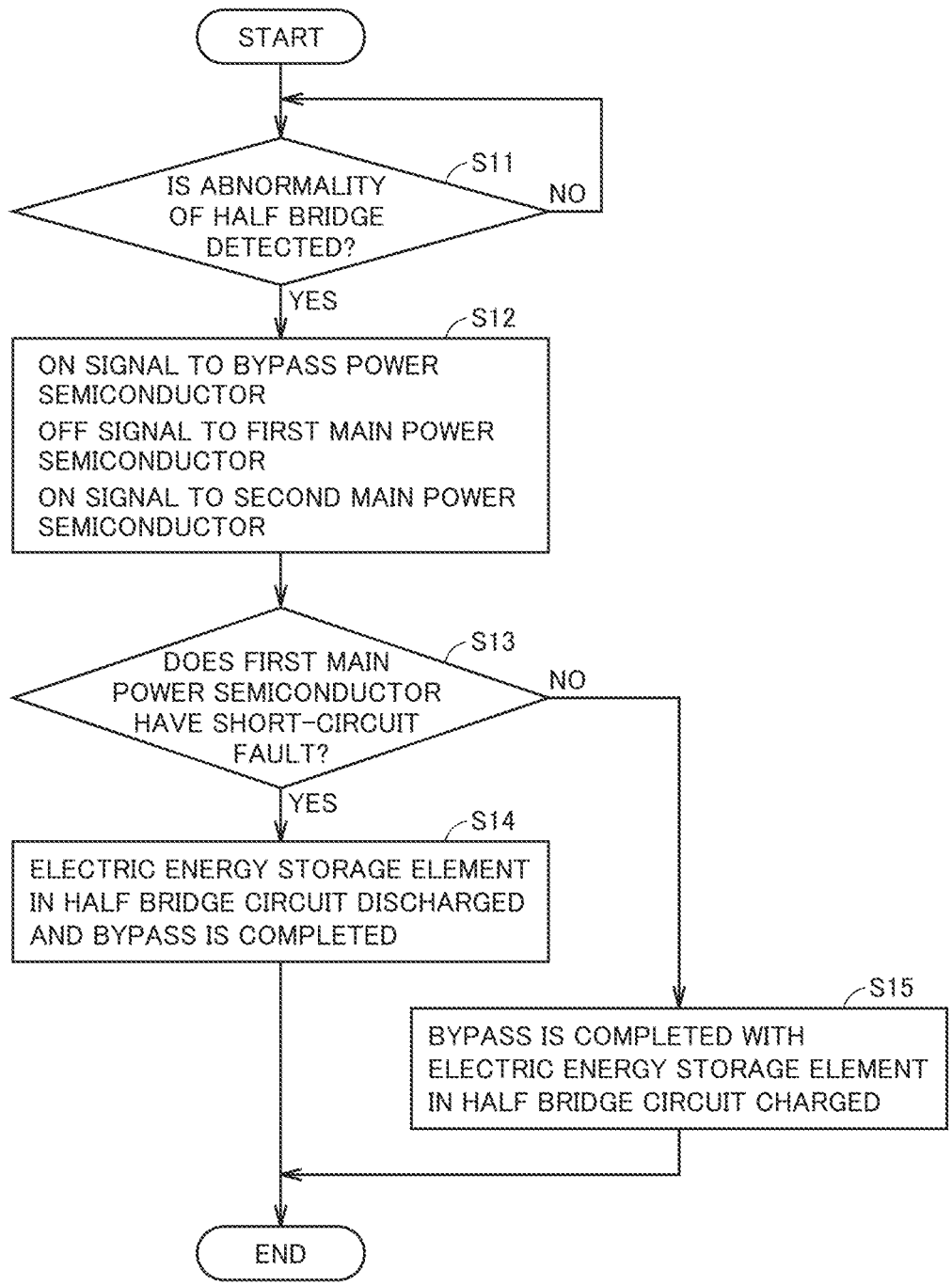
FIG. 11 is a flowchart illustrating an operation procedure from abnormality detection in submodule 101c until bypassing of the half bridge circuit having abnormality detected is completed, in the third embodiment.

FIG. 11 is a flowchart illustrating an operation procedure from abnormality detection in submodule 101c until bypassing of the half bridge circuit having abnormality detected is completed, in the third embodiment.

At step S11, abnormality detection means (not shown) included in individual controller 1009 or gate drive device 1010 detects whether there is abnormality in half bridge circuit 1004.

If abnormality in half bridge circuit 1004 is detected (S11: YES), the process proceeds to step S12.

At step S12, individual controller 1009 gives an on command simultaneously to bypass power semiconductor 1007 and main power semiconductor 1001b (second main power semiconductor) connected in parallel with bypass power semiconductor 1007 and gives an off command to main power semiconductor 1001a (first main power semiconductor).

At step S13, if first main power semiconductor has a short-circuit fault (S13: YES), the process proceeds to step S14.

At step S14, both ends of electric energy storage element 1003 are short-circuited to cause short-circuit current to flow, electric energy storage element 1003 is discharged, and bypassing is completed.

At step S13, if first main power semiconductor does not have a short-circuit fault (S13: NO), the process proceeds to step S15.

At step S15, since the voltage between both ends of electric energy storage element 1003 is carried by the first main power semiconductor, short-circuit current does not flow and bypassing is completed with electric energy storage element 1003 kept charged.

Although the short-circuit current described above is divided between main power semiconductor 1001b (second main power semiconductor) and bypass power semiconductor 1007, short-circuit current of bypass power semiconductor 1007 can be suppressed as follows. Main power semiconductors 1001a, 1001b and freewheeling diodes 1002a, 1002b are configured with a first power module, and bypass power semiconductor 1007a and freewheeling diode 1008 are configured with a second power module. These two power modules are connected through a conductor. The impedance of wiring of a path of short-circuit current passing through main power semiconductor 1001b (second main power semiconductor) is smaller than the impedance of wiring of a path of short-circuit current passing through bypass power semiconductor 1007. Consequently, short-circuit current of bypass power semiconductor 1007 can be suppressed, and destruction of bypass power semiconductor 1007 due to short-circuit current can be prevented effectively.

As described above, submodule 101c in the third embodiment is configured with one half bridge circuit. The third embodiment is similar to the first embodiment in the improvement in reliability of bypass power semiconductors and the power feeding method to the bypass power semiconductor but can achieve a smaller size per submodule because submodule 101c is configured with one half bridge circuit.

Fourth Embodiment

A fourth embodiment is directed to a method of starting the power conversion apparatus having an abnormal submodule. For example, when an abnormal submodule is always open, the initial charging of the power conversion apparatus is unable to be completed with such an abnormal submodule. Therefore, in order to start the power conversion apparatus with an abnormal submodule, it is requested that the abnormal submodule be bypassed reliably in advance and isolated from the power conversion apparatus.

Referring to FIG. 1, the process for the bypass power semiconductors before startup of the power conversion apparatus in the fourth embodiment will be described. The fourth embodiment is directed to a method of starting the power conversion apparatus and is applicable to the power conversion apparatus according to any of the first to third embodiments. The basic configuration of the submodule in the present embodiment is similar to the one described in FIG. 2 or FIG. 10.

Figure 12:
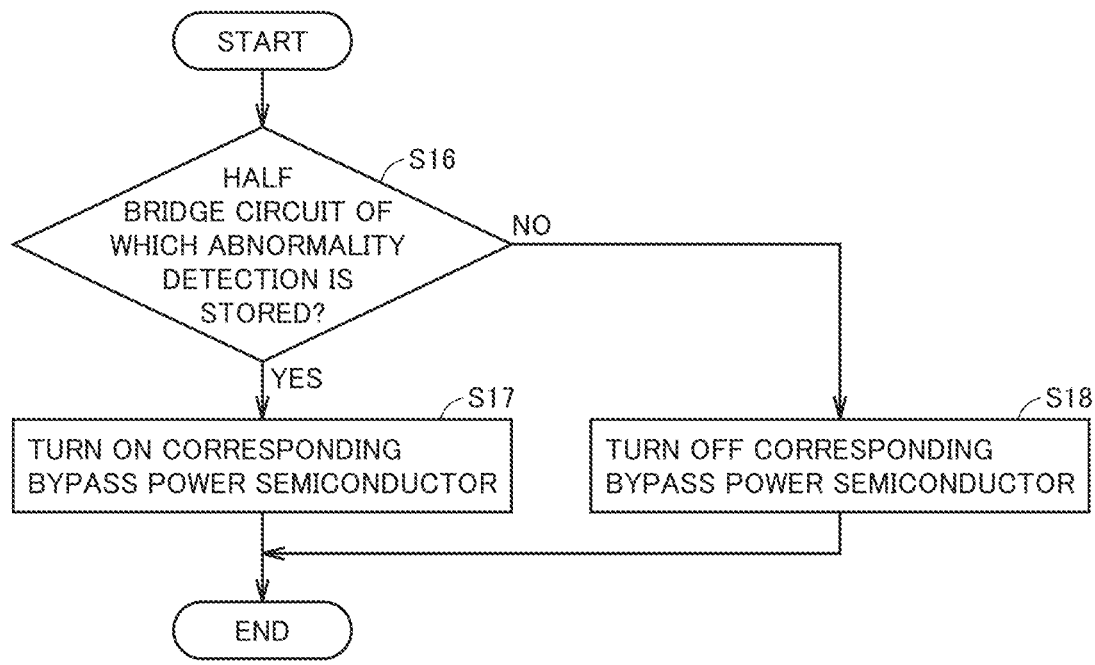
FIG. 12 is a flowchart showing a process performed on bypass power semiconductors before startup of the power conversion apparatus.

FIG. 12 is a flowchart showing a process performed on bypass power semiconductors before startup of the power conversion apparatus.

At step S16, if the half bridge circuit is a half bridge circuit of which abnormality detection is stored in central controller 103 (S16: YES), the process proceeds to step S17, and if it is a half bridge circuit of which abnormality detection is not stored in central controller 103 (S16: NO), the process proceeds to step S18.

At step S17, as the half bridge circuit having abnormality detected need to be isolated from power conversion apparatus 104, bypass unit drive device 212 turns on the corresponding bypass power semiconductor through optical power-feed from the ground potential.

At step S18, the corresponding bypass power semiconductor is set to the off state.

Main power semiconductors 201a, 201b in half bridge circuit 204a and main power semiconductors 201c, 201d in half bridge circuit 204b are set off since the power conversion apparatus is not yet started.

The bypass power semiconductor corresponding to each half bridge circuit is the bypass power semiconductor connected in parallel with each half bridge circuit. That is, corresponding to half bridge circuit 204a is bypass power semiconductor 207a, and corresponding to half bridge circuit 204b is bypass power semiconductor 207b.

As described above, the central controller stores a half bridge circuit having abnormality detected, and the half bridge circuit having abnormality detected is isolated from power conversion apparatus 104 in advance before startup, so that power conversion apparatus 104 can be started more reliably. In other words, a more reliable power conversion apparatus can be provided.

Fifth Embodiment

A submodule in a power conversion apparatus in a fifth embodiment includes a full bridge circuit. The full bridge circuit is configured with a combination of two half bridge circuits. This submodule is connected in series with another submodule through an external terminal.

Figure 13:
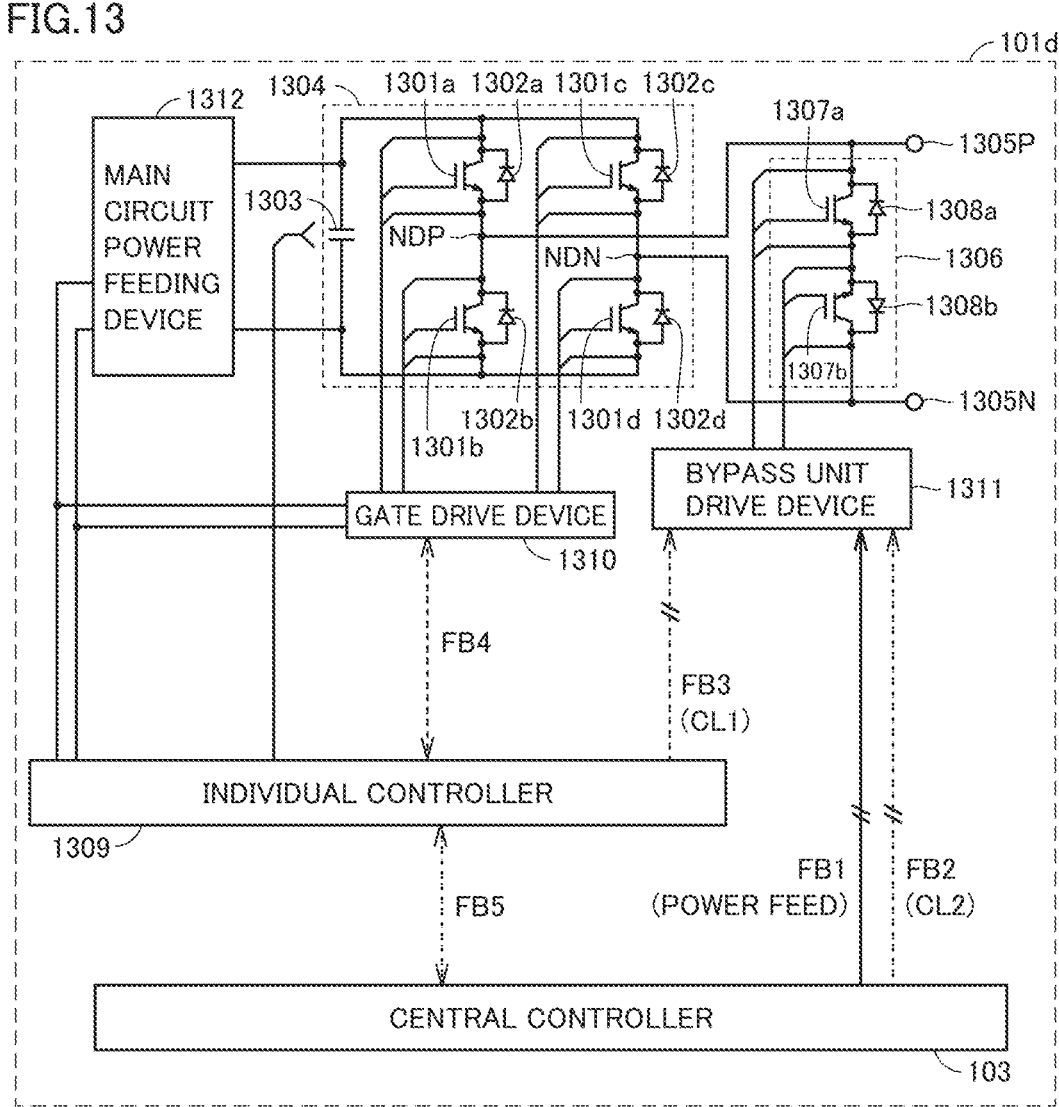
FIG. 13 is a diagram illustrating a configuration of a submodule 101d in a fifth embodiment.

FIG. 13 is a diagram illustrating a configuration of a submodule 101d in the fifth embodiment.

Submodule 101d includes a full bridge circuit 1304.

Full bridge circuit 1304 includes a main power semiconductor 1301a (first main power semiconductor) and a main power semiconductor 1301b (second main power semiconductor) connected in series, a main power semiconductor 1301c (third main power semiconductor) and a main power semiconductor 1301d (fourth main power semiconductor) connected in series, and an electric energy storage element 1303. The path of main power semiconductor 1301a and main power semiconductor 1301b connected in series, the path of main power semiconductor 1301c and main power semiconductor 1301d connected in series, and the path of electric energy storage element 1303 are connected in parallel.

Full bridge circuit 1304 further includes a freewheeling diode 1302a connected in anti-parallel with main power semiconductor 1301a, a freewheeling diode 1302b connected in anti-parallel with main power semiconductor 1301b, a freewheeling diode 1302c connected in anti-parallel with main power semiconductor 1301c, and a freewheeling diode 1302d connected in anti-parallel with main power semiconductor 1301d.

Submodule 101d includes a main circuit power feeding device 1312, a gate drive device 1310, an individual controller 1309, a bypass unit 1306, and a bypass unit drive device 1311, in the same manner as the first embodiment.

Main circuit power feeding device 1312 is connected in parallel with electric energy storage element 1303. A node NDP between main power semiconductor 1301a and main power semiconductor 1301b is connected to an external terminal 1305P. A node NDA between main power semiconductor 1301c and main power semiconductor 1301d is connected to an external terminal 1305N.

Bypass unit 1306 is connected to external terminal 1305P and external terminal 1305N and disposed between external terminal 1305P and external terminal 1305N.

Bypass unit 1306 includes a bypass power semiconductor 1307a and a bypass power semiconductor 1307b connected in series, a freewheeling diode 1308a connected in anti-parallel with bypass power semiconductor 1307a, and a freewheeling diode 1308b connected in anti-parallel with bypass power semiconductor 1307b.

Bypass power semiconductor 1307a and bypass power semiconductor 1307b are connected in opposite directions to each other. That is, for example, when bypass power semiconductor 1307a and bypass power semiconductor 1307b are configured with IGBTs, as shown in FIG. 13, the emitter of bypass power semiconductor 1307a and the emitter of bypass power semiconductor 1307b are connected. Alternatively, the collector of bypass power semiconductor 1307a and the collector of bypass power semiconductor 1307b may be connected. This is because, unlike a single half bridge circuit, full bridge circuit 1304 can output voltage having negative polarity in addition to positive polarity. In normal time (during non-bypassing), the operation of full bridge circuit 1304 can continue when either polarity of voltage is output from full bridge circuit 1304.

Bypass unit 1306 is in the open mode when submodule 101d is normal. For example, when bypass power semiconductor 1307a and bypass power semiconductor 1307b are formed with IGBTs, a state in which gate voltage is not applied to bypass power semiconductor 1307a and bypass power semiconductor 1307b or a state in which voltage is applied to negative bias (off command state) is set in the open mode.

When abnormality detection means (not shown) included in individual controller 1309 or gate drive device 1310 detects abnormality of full bridge circuit 1304, such as a short-circuit fault of main power semiconductors 1301a to 1301d, individual controller 1309 gives an off command to main power semiconductors 1301a, 1301b, 1301c, 1301d. Bypass unit drive device 1311 is controlled based on a signal of individual controller 1309 or central controller 103. Bypass unit drive device 1311 short-circuits bypass power semiconductor 1307a and bypass power semiconductor 1307b included in bypass unit 1306.

This configuration isolates submodule 101d having abnormality from power conversion apparatus 104 and enables continuous operation of power conversion apparatus 104.

The communication means for a control signal and the power feeding method between gate drive device 1310 and bypass unit drive device 1311, and individual controller 1309 and central controller 103 in the present embodiment are similar to the first embodiment.

The maximum voltage appearing between both ends of external terminals 1305P, 1305N is equal to voltage VCDC between both ends of electric energy storage element 1303. Therefore, the maximum voltage applied to bypass power semiconductors 1307a, 1307b is basically equal to the maximum voltage applied to bypass power semiconductors 207a, 207b described with reference to FIG. 2 in the first embodiment.

Therefore, also in the fifth embodiment, a power semiconductor having a rated voltage higher than main power semiconductors 1301a, 1301b, 1301c, 1301d is used for bypass power semiconductor 1307, in the same manner as bypass power semiconductors 207a, 207b in the first embodiment. With this configuration, the reliability of bypass unit 1306 can be improved.

Abnormality detection means (not shown) included in individual controller 1309 or gate drive device 1310 detects whether there is abnormality in full bridge circuit 1304.

When abnormality of full bridge circuit 1304 is detected, individual controller 1309 gives an on command to bypass power semiconductors 1307a, 1307b and gives an off command to main power semiconductors 1301a, 1301b, 1301c, 1301d.

As described above, an off command is applied to all of main power semiconductors 1301a, 1301b, 1301c, 1301d whereby bypassing is completed with electric energy storage element 1303 kept charged, except when both of main power semiconductors 1301a, 1301d have a short-circuit fault and when both of main power semiconductors 1301b, 1301c have a short-circuit fault.

On the other hand, when both of main power semiconductors 1301a, 1301d have a short-circuit fault or when both of main power semiconductors 1301b, 1301c have a short-circuit fault, execution of bypassing operation may cause a short circuit in electric energy storage element 1303, and short-circuit current may flow through bypass power semiconductors 1307a, 1307b, leading to a failure.

Therefore, in order to improve reliability, for example, protection means against short circuit of bypass power semiconductors 1308a, 1308b may be provided in bypass unit drive device 1311.

As described above, submodule 101d in the fifth embodiment is configured with a full bridge circuit including a combination of two half bridge circuits. The submodule in the fifth embodiment can improve the reliability of the bypass power semiconductor in the same manner as in the first embodiment and has a power feeding method to the bypass power semiconductor similar to the first embodiment.

Since submodule 101d in the fifth embodiment is configured with a full bridge circuit and can output voltage having negative polarity, the operating range of power conversion apparatus 104 can be increased.

In submodule 101d in the fifth embodiment, the electric energy storage element is not short-circuited and bypassing can be completed reliably even when any one of the main power semiconductors is short-circuited, except when two main power semiconductors 1301a and 1301d or two main power semiconductors 1301b and 1301c have a short-circuit fault simultaneously.

The embodiments disclosed here should be understood as being illustrative in all respects and should not be construed as being limitative. The scope of the present disclosure is shown not in the foregoing description but in the claims, and it is intended that all modifications that come within the meaning and range of equivalence to the claims are embraced here.

REFERENCE SIGNS LIST

101a, 101b, 101c, 101d submodule, 102 reactor, 103 central controller, 104 power conversion apparatus, 105 load, 106 DC voltage source, 201a, 201b, 201c, 201d, 1001a, 1001b, 1301a, 1301b, 1301c, 1301d main power semiconductor, 202a, 202b, 202c, 202d, 208a, 208b, 1002a, 1002b, 1008, 1302a, 1302b, 1302c, 1302d, 1308a, 1308b freewheeling diode, 203a, 203b, 1003, 1303 electric energy storage element, 204a, 204b, 1004 half bridge circuit, 205P, 205N, 1005P, 1005N, 1305P, 1305N external terminal, 206, 1006, 1306 bypass unit, 207a, 207b, 1007, 1307a, 1307b bypass power semiconductor, 209 intermediate terminal, 210, 1009, 1309 individual controller, 211a, 211b, 1010, 1310 gate drive device, 212, 1011, 1311 bypass unit drive device, 213a, 213b, 1012, 1312 main circuit power feeding device, 401 power module, 701 impedance element, 1304 full bridge circuit, FB1, FB2, FB3, FB4, FB4a, FB4b, FB5 optical fiber.

The invention claimed is:

1. A power conversion apparatus comprising:
   a plurality of submodules connected in series for performing power conversion, the submodules each including
     a bridge circuit including two main power semiconductors connected in series for performing power conversion by on/off control and an electric energy storage circuit connected in parallel with a path of the two main power semiconductors connected in series,
     a bypass circuit including a bypass power semiconductor,
     a bypass drive circuit to drive the bypass circuit, and
     a first external terminal and a second external terminal,
   wherein the bypass circuit is disposed between the first external terminal and the second external terminal, and the first external terminal is connected to a node between the two main power semiconductors,
   the power conversion apparatus further comprising an optical power-feed system to feed power to the bypass drive circuit, a gate drive device to drive the two main power semiconductors, an individual controller circuit to control the bypass drive circuit and the gate drive device, and a main circuit power feeding device connected in parallel with the electric energy storage circuit to supply power to the individual controller circuit and the gate drive device.

2. The power conversion apparatus according to claim wherein the power fed by the optical power-feed using the light operates the bypass power semiconductors in the bypass drive circuit without using power from a main circuit power feeding device that supplies power to a gate drive device that drives the two main power semi conductors.

3. The power conversion apparatus according to claim 1, wherein the bypass power semiconductor is a three-terminal semiconductor device, and the bypass drive circuit is connected to all three terminals of the three-terminal semiconductor device.

4. The power conversion apparatus according to claim 1, wherein the optical power-feed system includes an optical fiber that transmits light to a photo diode that converts the light into electric power to be used by the bypass drive circuit to keep the bypass power semiconductor in the bypass circuit in an on state.

5. The power conversion apparatus according to claim 1, wherein the bypass power semiconductor is a power semiconductor having a higher rated voltage compared with the main power semiconductor.

6. The power conversion apparatus according to claim 1, wherein the power conversion apparatus has a first transmission path and a second transmission path to transmit a signal for turning on the bypass power semiconductor.

7. The power conversion apparatus according to claim 6, wherein a transmission time for the signal via the first transmission path is shorter than a transmission time for the signal via the second transmission path.

8. The power conversion apparatus according to claim 1, wherein when abnormality is detected in the bridge circuit, the individual controller circuit outputs a command to turn on, of the two main power semiconductors, a main power semiconductor connected in parallel with the bypass power semiconductor to be set to an on state, and transmits a command to set the other main power semiconductor of the two main power semiconductors to an off state.

9. The power conversion apparatus according to claim 1, wherein
the submodule includes, as the bridge circuit, a first half bridge circuit and a second half bridge circuit,
the first half bridge circuit includes a first main power semiconductor and a second main power semiconductor connected in series,
the second half bridge circuit includes a third main power semiconductor and a fourth main power semiconductor connected in series,
the bypass circuit includes
a first bypass power semiconductor connected in parallel with the second main power semiconductor and a second bypass power semiconductor connected in parallel with the third main power semiconductor, the first main power semiconductor and the second bypass power semiconductor being connected in series, and
a connection point of the second main power semiconductor and the third main power semiconductor and a connection point of the first bypass power semiconductor and the second bypass power semiconductor are electrically connected.

10. The power conversion apparatus according to claim 9, wherein when abnormality is detected in the first half bridge circuit, the individual controller circuit outputs a command to turn on the second main power semiconductor and transmits a command to set the first main power semiconductor to an off state, and when abnormality is detected in the second half bridge circuit, the individual controller circuit outputs a command to turn on the third main power semiconductor and transmits a command to set the fourth main power semiconductor to an off state.

11. The power conversion apparatus according to claim 9, wherein a connection point of the second main power semiconductor and the third main power semiconductor and a connection point of the first bypass power semiconductor and the second bypass power semiconductor are electrically connected through an impedance circuit.

12. The power conversion apparatus according to claim 9, wherein the first bypass power semiconductor and the second bypass power semiconductor are configured with one power semiconductor module.

13. The power conversion apparatus according to claim 1, wherein
the submodule includes one half bridge circuit as the bridge circuit,
the half bridge circuit includes the two main power semiconductors, and
the bypass circuit includes the bypass power semiconductor.

14. The power conversion apparatus according to claim 1, wherein the power conversion apparatus comprises a central controller circuit to store the submodule having abnormality detected and bypass the stored submodule in advance at startup.

15. The power conversion apparatus according to claim 1, wherein
the submodule includes a full bridge circuit as the bridge circuit,
the full bridge circuit includes
a first main power semiconductor and a second main power semiconductor connected in series,
a third main power semiconductor and a fourth main power semiconductor connected in series, and
the electric energy storage circuit,
a path of the first main power semiconductor and the second main power semiconductor connected in series, a path of the third main power semiconductor and the fourth main power semiconductor connected in series, and a path of the electric energy storage circuit are connected in parallel,
the first external terminal is connected to a node between the first main power semiconductor and the second main power semiconductor,
the second external terminal is connected to a node between the third main power semiconductor and the fourth main power semiconductor,
the bypass circuit includes a first bypass power semiconductor and a second bypass power semiconductor connected in series, and
the first bypass power semiconductor and the second bypass power semiconductor are connected in opposite directions to each other.

16. The power conversion apparatus according to claim 15, wherein the power conversion apparatus comprises an individual controller circuit to, when abnormality is detected in the full bridge circuit, output a command to set the first main power semiconductor, the second main power semiconductor, the third main power semiconductor, and the fourth main power semiconductor to an off state, and short-circuit first bypass power semiconductor and the second bypass power semiconductor.

17. A power conversion apparatus comprising:
a plurality of submodules connected in series for performing power conversion, the submodules each including
a bridge circuit including, two main power semiconductors connected in series for performing power conversion by on/off control and an electric energy storage circuit connected in parallel with a path of the two main power semiconductors connected in series,
a bypass circuit including a bypass power semiconductor,
a bypass drive circuit to drive the bypass circuit, and
a first external terminal and a second external terminal,
wherein the bypass circuit is disposed between the first external terminal and the second external terminal, and the first external terminal is connected to a node between the two main power semiconductors,
the power conversion apparatus further comprising an optical power-feed system to feed power to the bypass drive circuit using light, the optical power-feed system including an optical fiber that transmits the light to a photo diode that converts the light into electric power to be used by the bypass drive circuit to keep the bypass power semiconductor in the bypass circuit in an on state, wherein the power conversion apparatus has a first transmission path and a second transmission path to transmit a signal for turning on the bypass power semiconductor, the power conversion apparatus further comprising:

an individual controller circuit to be driven by electric power generated by the electric energy storage circuit, and a central controller circuit connected to a ground potential, wherein the individual controller circuit transmits a first control signal for turning on the bypass power semiconductor to the bypass drive circuit through the first transmission path, the central controller circuit transmits a second control signal for turning on the bypass power semiconductor to the bypass drive circuit through the second transmission path, and a time from abnormality detection in the submodule until the first control signal is transmitted to the bypass drive circuit is shorter than a time from abnormality detection in the submodule until the second control signal is transmitted to the bypass drive circuit.

* * * * *